United States Patent
Zhaohu et al.

(10) Patent No.: US 8,375,153 B2
(45) Date of Patent: Feb. 12, 2013

(54) METHOD FOR DATA OUTPUT CONTROL

(75) Inventors: Jin Zhaohu, Hangzhou (CN); Qiang Liu, Zhejiang Province (CN); XinYu Hou, Hangzhou (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 468 days.

(21) Appl. No.: 12/429,395

(22) Filed: Apr. 24, 2009

(65) Prior Publication Data
US 2009/0300233 A1    Dec. 3, 2009

(30) Foreign Application Priority Data

May 30, 2008 (CN) .......................... 2008 1 0114079

(51) Int. Cl.
*G06F 3/00* (2006.01)
*G06F 13/00* (2006.01)
*G01R 31/08* (2006.01)
*H04J 3/16* (2006.01)

(52) U.S. Cl. ................ 710/34; 710/20; 710/33; 710/51; 710/107; 370/229; 370/232; 370/235; 370/235.1; 370/468

(58) Field of Classification Search ............... 710/20, 710/33–34, 41, 107; 709/232; 370/229, 370/232, 235.1, 252, 389, 352, 392, 401, 370/468, 235, 397–398, 428, 470
See application file for complete search history.

(56) References Cited

U.S. PATENT DOCUMENTS

| | | | | |
|---|---|---|---|---|
| 5,974,054 A * | 10/1999 | Couts et al. | ................... | 370/470 |
| 6,117,188 A * | 9/2000 | Aronberg et al. | ............ | 717/176 |
| 6,212,194 B1 | 4/2001 | Hsieh | | |
| 6,289,386 B1 * | 9/2001 | Vangemert | ..................... | 709/232 |
| 6,442,162 B1 * | 8/2002 | O'Neill et al. | ................ | 370/389 |
| 6,633,569 B2 * | 10/2003 | Hemmady | ..................... | 370/398 |
| 6,801,500 B1 * | 10/2004 | Chandran | ................. | 370/230.1 |
| 6,922,408 B2 * | 7/2005 | Bloch et al. | ..................... | 370/389 |
| 6,965,933 B2 * | 11/2005 | Haartsen | ....................... | 709/223 |
| 7,327,692 B2 * | 2/2008 | Ain et al. | ...................... | 370/252 |
| 7,426,185 B1 * | 9/2008 | Musacchio et al. | ........ | 370/235.1 |
| 7,430,172 B2 * | 9/2008 | Brandenburg et al. | ....... | 370/235 |
| 7,706,394 B2 * | 4/2010 | Blanc et al. | ..................... | 370/428 |
| 7,787,367 B2 * | 8/2010 | Gusat et al. | ................... | 370/229 |

(Continued)

FOREIGN PATENT DOCUMENTS

| CN | 1168585 | 12/1997 |
|---|---|---|
| CN | 14444358 | 9/2003 |

(Continued)

*Primary Examiner* — Idriss N Alrobaye
*Assistant Examiner* — Henry Yu (57) ABSTRACT

The present invention relates to a method for data output control, which comprises: obtaining the length of idle bits in the cache queue of a data output interface, and if the idle-bit length is equal to or longer than the length of the data to be sent on the interface, putting the data into the cache queue of the interface. In addition, this present invention discloses another data output control method, and two types of data output control apparatuses. Using this invention can avoid flow interruption.

15 Claims, 5 Drawing Sheets

U.S. PATENT DOCUMENTS

| | | | |
|---|---|---|---|
| 7,813,365 B2 * | 10/2010 | Brewer et al. | 370/414 |
| 2002/0051456 A1 * | 5/2002 | Kinnunen | 370/397 |
| 2003/0135449 A1 * | 7/2003 | Xu et al. | 705/38 |
| 2004/0032872 A1 * | 2/2004 | Dhara | 370/401 |
| 2005/0195803 A1 * | 9/2005 | Hosokubo | 370/352 |
| 2006/0251074 A1 * | 11/2006 | Solomon | 370/392 |
| 2007/0288931 A1 * | 12/2007 | Avkarogullari | 719/312 |
| 2008/0147944 A1 * | 6/2008 | Sonntag et al. | 710/240 |
| 2008/0175269 A1 * | 7/2008 | Alvarez et al. | 370/468 |
| 2009/0122698 A1 * | 5/2009 | Lakshmikantha et al. | 370/229 |

FOREIGN PATENT DOCUMENTS

| | | |
|---|---|---|
| CN | 101094181 | 12/2007 |
| JP | 2002-164914 | 6/2002 |
| WO | WO01/95576 | 12/2001 |

* cited by examiner

METHOD FOR DATA OUTPUT CONTROL

CROSS-REFERENCE TO RELATED APPLICATIONS

The present application claims priority to Chinese Patent Application CN CN200810114079.5 filed in the PRC Patent Office on May 30, 2008, the entire contents of which is incorporated herein by reference.

BACKGROUND

1. Field of the Invention

The present invention relates to data transmission technology, and, more particularly, to a method and an apparatus for data output control.

2. Description of the Related Art

Current data forwarding devices adopt many traffic output control methods, such as the committed access rate (CAR) technology. CAR puts tokens into a token bucket at a user-specified rate and injects interesting packets into the token bucket for output control. If the token bucket has enough tokens for sending packets, CAR allows these packets to pass, puts them into the cache queue of the data output interface, and sends them out; if not, CAR discards these packets.

However, CAR has following drawbacks.

CAR injects tokens at a fixed rate, and as long as there are enough tokens, sends packets to the cache queue of the data output interface. If the data output interface is sending packets at a lower rate, the cache queue may get full, causing packets arriving at it to be discarded.

If there are not enough tokens, CAR discards the packets directly.

Both situations cause traffic interruption, which is fatal to such applications as video transmission.

Other commonly used traffic output control technologies use various types of scheduling mechanisms, such as round robin (RR) scheduling, and weighted round robin (WRR) scheduling. They are applicable to forwarding devices with multiple output interfaces, and enable all output interfaces to share the total output bandwidth. With these scheduling mechanisms, data is scheduled from data output interfaces either directly to their cache queues or after CAR identifies that it is permitted to be sent. Whichever approach is used, traffic interruption may occur when the sending rate on the data output interface is low.

In addition, current fair scheduling mechanisms cannot provide differentiated services for output interfaces, resulting in improper bandwidth assignment. Weighted scheduling mechanisms can provide weight-based differentiated services. The more weight an interface has, the more bandwidth it gets. However, because weights are manually assigned to interfaces, weighted scheduling mechanisms cannot adapt to dynamic changes.

SUMMARY

The present invention provides a method for data output control to avoid traffic interruption, which comprises:

obtaining the idle-bit length of the cache queue of a data output interface;

putting the data to be sent on the interface to its cache queue when the idle-bit length is equal to or longer than the length of data to be sent;

Preferably, the idle-bit length of the cache queue of the data output interface is represented by the number of tokens in a token bucket, which comprises:

setting a token bucket for the data output interface;

counting the number of data bits to be sent, and when the number reaches a preset threshold, putting the same number of tokens as the threshold into the token bucket;

after data bits are put into the cache queue of the data output interface, reducing from the token bucket the same number of tokens as the number of these data bits;

The present invention provides another method for data output control to avoid traffic interruption, which comprises:

obtaining the idle-bit length of the cache queue of each data output interface;

Using the idle-bit length information to determine the current data output interface, which must have an idle-bit length equal to or longer than the length of the data to be sent on it;

putting the data to be sent on the current data output interface to its cache queue;

Preferably, the idle-bit length of the cache queue of each data output interface is represented by the number of tokens in a token bucket, which comprises:

setting a token bucket for each data output interface;

counting the number of data bits to be sent on each data output interface, and when the number reaches a preset threshold on an interface, putting the same number of tokens as the threshold into its token bucket;

after putting data bits into the cache queue of the data output interface, reducing from the token bucket the same number of tokens as the number of these scheduled data bits.

Wherein, the current data output interface is determined as follows:

sorting data output interfaces by idle-bit length in descending order and finding the data output interface with the longest idle-bit length;

selecting the data output interface with the longest idle-bit length as the current data output interface if its idle-bit length is equal to or longer than the length of data bits to be sent.

Preferably, this method further comprises: if the idle-bit length of the data output interface with the longest idle-bit length is shorter than the length of data bits to be sent on it, resorting those data output interfaces.

Wherein, the current data output interface is determined as follows:

finding data output interfaces with an idle-bit length equal to or longer than the length of data bits to be sent;

selecting the data output interface with the longest idle-bit length among these found interfaces as the current data output interface.

Preferably, this method, after putting the data to be sent on the current data output interface into its cache queue, further comprises:

repeating the operation of finding data output interfaces with an idle-bit length equal to or longer than the length of data bits to be sent.

or taking each of those qualified data output interfaces (except for the output interface with the longest idle-bit length) in sequence as the current data output interface, putting the data to be sent on it into the corresponding cache queue, and then repeating the operation of finding data output interfaces with an idle-bit length equal to or longer than the length of data bits to be sent.

Wherein, the current data output interface is determined as follows:

finding data output interfaces with an idle-bit length equal to or longer than the length of data bits to be sent;

calculating the difference between the idle-bit length and the length of data bits to be sent for each data output interface;

sorting these data output interfaces according to the differences from high to low and taking the one with the highest difference as the current data output interface.

Preferably, this method, after putting the data to be sent on the current data output interface into its cache queue, further comprises:

repeating the operation of finding data output interfaces with an idle-bit length equal to or longer than the length of data bits to be sent;

or taking each of those qualified data output interfaces (except for the output interface with the highest difference) in sequence as the current data output interface, putting the data to be sent on it into the corresponding cache queue, and then repeating the operation of finding data output interfaces with an idle-bit length equal to or longer than the length of data bits to be sent.

The present invention provides a data output control apparatus to avoid traffic interruption, which comprises:

a output control unit, which gets the idle-bit length of the cache queue of the data output interface unit, and if the idle-bit length is equal to or longer than the length of data bits to be sent, puts the data to be sent into the cache queue of the data output interface unit;

an output control unit, which gets idle-bit length of the cache queue of the data output interface unit, and if the idle-bit length is equal to or longer than the length of data bits to be sent, puts the data to be sent into the cache queue of the data output interface unit;

The present invention provides another data output control apparatus to avoid traffic interruption, which comprises:

a output control unit, which gets the idle-bit length of each data output interface unit, uses the idle-bit length information to select the current data output interface unit (which must have a idle-bit length equal to or longer than the data to be sent on it), and puts the data to be sent on the selected data output interface unit into its cache queue;

data output interface units, which send out data in their cache queue.

Wherein, the output control unit comprises:

an idle-bit length obtaining module, which obtains the length of idle bits in the cache queue of each data output interface unit according to the traffic information received from data output interface units, and sends the idle-bit length information to the scheduling module;

a scheduling module, which uses the idle-bit length information to select the current data output interface unit (which must have a idle-bit length equal to or longer than the length of data to be sent);

an output module, which puts the data to be sent on the selected current data output interface unit into its cache queue.

Wherein, the data output interface units are also responsible for sending traffic information to the output control unit.

Wherein, the scheduling module comprises:

a sorting sub-module, which sequences data output interfaces by idle-bit length in descending order and finds the data output interface with the longest idle-bit length;

a confirmation sub-module, which takes the data output interface with the longest idle-bit length as the current data output interface when its idle-bit length is equal to or longer than the length of data to be sent.

Wherein, the scheduling module comprises:

a sorting sub-module, which identifies data output interfaces with an idle-bit length equal to or longer than the length of the data to be sent and sequences these data output interfaces by idle-bit length in descending order;

a confirmation sub-module, which takes the data output interface with the longest idle-bit length among those qualified interfaces as the current data output interface.

Wherein, the scheduling module comprises:

a sorting sub-module, which identifies data output interfaces with an idle-bit length equal to or longer than the length of the data to be sent, calculates the difference between the idle-bit length and the length of data bits to be sent for each of these found data output interfaces, and sequences these data output interfaces according to the differences from high to low;

a confirmation sub-module, which takes the data output interface with the highest difference among those qualified interfaces as the current data output interface.

Wherein, the data output interface unit comprises:

a counter, which counts the number of data bits to be sent, when the number reaches the threshold, informs the pulse generator of the event and resets to zero;

a pulse generator, which generates pulse signals to the output control unit upon receiving the event;

a data output interface, which sends data out of the apparatus;

a cache queue, which caches the data received from the output control unit.

Wherein, the idle-bit length obtaining module comprises the token buckets of data output interface units and a token bucket maintenance sub-module, which:

upon receiving pulse signals, puts the same number of tokens as the threshold into the token bucket of the data output interface unit that sent the pulse signals; takes the token number of each data output interface unit as the idle-bit length, and sends such idle-bit length information to the scheduling module; after the output module puts the data to be sent on the current data output interface unit into its cache queue, reduces the same number of tokens as the number of scheduled data bits from the token bucket of the current data output interface unit.

The above embodiments of the present invention use idle-bit information in the cache queue of a data output interface to determine whether to schedule the data to be sent on the interface. Only when the cache queue can accommodate the data to be sent, can the data be put into the cache queue of the interface. When the sending rate on the interface is low and its idle-bit length is thus shorter than the length of data to be sent, the data cannot be put into the cache queue of the interface to avoid discarding packets due to overflow of the cache queue. This ensures data continuity.

If more than one data output interface exists, an embodiment of the present invention obtains the idle-bit length of each interface and determines the current data output interface based on such idle-bit length information. The cache queue of the current data output interface must be capable of accommodating the data to be sent on it to avoid discarding packets due to overflow of the cache queue and to ensure data continuity.

In addition, the current data output interface must have the longest idle-bit length among those existing output interfaces. In this way, an interface with more idle bits is scheduled first, and the more times an interface is scheduled, the more bandwidth it occupies. Therefore, the present invention allows for dynamic bandwidth adjustment based on the actual data output situations on interfaces, which cannot be achieved by using a fair scheduling method or a fixed-weight based scheduling method.

The embodiments of the present invention use tokens to represent idle bits in the cache queue of a data output interface. This method exactly reflects the data length an interface's cache queue can accommodate, and thus implements precise data output control.

DETAILED DESCRIPTION

The present invention provides a method for data output control, which obtains the idle-bit length of the cache queue of a data output interface, and puts the data to be sent on the interface to its cache queue when the idle-bit length is equal to or longer than the length of data to be sent on the interface.

The embodiments of the present invention use idle-bit information in the cache queue of a data output interface to determine whether to schedule the data to be sent on the interface. Only when the cache queue can accommodate the data to be sent, can the data be put into the cache queue of the interface. When the sending rate on the interface is low, and its idle-bit length is thus shorter than the length of data to be sent, the data cannot be put into the cache queue of the interface to avoid discarding packets due to overflow of the cache queue and to ensure data continuity.

The present invention is applicable to data forwarding devices with one or more data output interfaces. The data output interfaces of a device may have different bandwidths and thus have different sending rates. In this case, the device needs to perform scheduling to select the current data output interface.

If more than one data output interface exists, an embodiment of the present invention obtains the idle-bit length of each interface that reflects how many data bits an interface' cache queue can accommodate, and determines the current data output interface based on such idle-bit length information. The cache queue of the current data output interface must be capable of accommodating the data to be sent on it, that is, the cache queue must have an idle-bit length equal to or longer than the length of data to be sent on it, to avoid discarding packets due to overflow of the cache queue and to ensure data continuity.

The present invention is applicable to data forwarding devices, such as switches, routers, multi-media gateways and video gateways. For switches and routers, a data output interface in the present invention refers to an egress interface. For multi-media gateways and video gateways, a data output interface in the present invention refers to an internal video port (VP). The data output control mechanism of the embodiments of the present invention can be implemented by using the Field Programmable Gate Array (FPGA) technology, or the Application Specific Integrated Circuit (ASIC) technology.

The following takes an application of the present invention on a video gateway as an example, and uses corresponding figures and embodiments to detail the data output control method of the present invention.

A video gateway is responsible for forwarding video flows. It performs image processing for the video data to be sent and then sends the video data to the digital signal processor (DSP) through the VP corresponding to the video data at a certain frame rate. The DSP encodes and encapsulates the video data before sending it out. Each VP corresponds to a cache queue, which is called a transmission queue (TXQ). A TXQ caches the processed video data.

The sending bandwidth of a VP depends on the processing resources of the corresponding DSP. DSPs corresponding to different VPs have different processing capabilities, and thus VPs have different bandwidths for sending data to the corresponding DSPs.

Multiple VPs may use a common DSP. In this case, when sending out the data received from VP A, the DSP releases relevant encoding resources, and then use these resources to process data from other VPs. Therefore, other VPs can send data in their cache queues to the DSP faster. As a result, VPs' available bandwidths are increased.

An embodiment of the present invention schedules VPs according to their actual bandwidths and makes adjustments when detecting bandwidth changes on them, thus implementing dynamic VP bandwidth adjustment.

Figure 1:
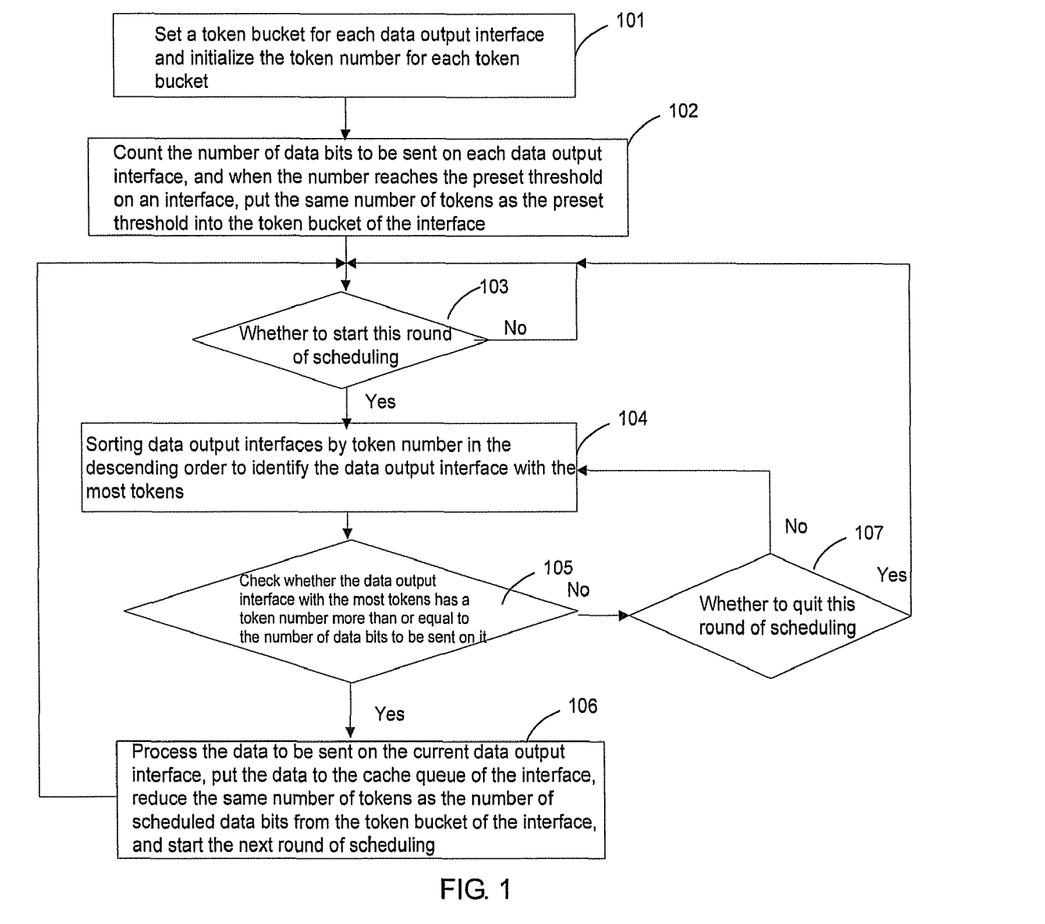
FIG. 1 is a flow chart illustrating the data output control method of an embodiment of the present invention.

FIG. 1 is a flow chart illustrating the data output control method of an embodiment of the present invention. A VP is called a data output interface, and the TXQ corresponding to the VP is called a cache queue in this flow chart. The illustrated method comprises following steps:

Step 101: sets a token bucket for each data output interface and initializes the token number for each token bucket.

Wherein, token number initialization for each token bucket comprises: setting the token number as the cache queue length of the data output interface, or as a percent of the cache queue length of the data output interface, or as a fixed value that is no longer than the cache queue length of the data output interface.

A token bucket mentioned in the embodiments of the present invention refers to a recording device that has a value set, performs simple add/subtract calculations and records numbers. A token bucket can be composed of a register and a calculator. The register has an initial value set at step 101. When tokens are reduced or increased at the following steps, the calculator computes the number based on the value recorded by the register, and saves the result into the register. Another example is to use a calculator as a token bucket. In this case, the calculator has an initial value set at step 101. When tokens are reduced or increased at the following steps, the calculator computes the number based on the current value.

Step 102: counts the number of data bits to be sent on each data output interface, and when the number reaches the preset threshold on an interface, puts the same number of tokens as the threshold into the token bucket of the interface;

For example, when the number of data bits to be sent on data output interface 1 reaches the preset threshold, the interface generates a pulse. After the pulse is detected, the event is confirmed, and then the same number of tokens as the threshold are put into the token bucket of the interface. An increase of tokens for data output interface 1 increases its likelihood of being scheduled.

Data output interfaces can have a common threshold or different thresholds configured.

Step 102 is performed repeatedly in real time.

Step 103: determines whether to perform scheduling. If yes, step 104 is performed; if not, step 103 continues to be performed.

A video gateway sends a specified number of data bits every a specified time. For example, it sends a data frame every 1/30 s, and a frame can be sent at any time during the 1/30 s. Therefore, whether to perform scheduling is determined every 1/30 s at this step.

Step 104: sequences data output interfaces that have data to send according to the number of tokens in their token buckets, and selects the interface with the most tokens.

The sorting process is as follows:

Select all enabled data output interfaces;

Select enabled data output interfaces that have data to send.

Step 105: checks whether the data output interface with the most tokens has a token number more than or equal to the number of data bits to be sent on it. If yes, the interface is selected as the current data output interface and step 106 is performed. If not, scheduling fails and step 107 is performed.

The more tokens an interface has, the more data bits it needs to send, and the higher scheduling priority it has.

Step 106: processes the data to be sent on the current data output interface, puts it to the cache queue of the interface, reduces the same number of tokens as the number of the schedule data bits, and returns to step 103 to enter the next round of scheduling.

On a video gateway, processing the data to be sent on the current data output interface and putting the data to the cache queue of the interface comprise:

generating a sending command for the data to be sent and putting the command into the sending command queue, which comprises the storage address and length of the data to be sent.

processing the commands in the sending command queue in sequence, and putting the data to be sent that is obtained through the command into the data queue.

processing the data in the data queue, such as image processing, in sequence, and putting the processed data to the TXQ of the corresponding VP, which will be sent to the DSP for processing.

Step 107: determines whether to quit this round of scheduling. If yes, the program returns to step 103 to enter the next round of scheduling. If not, the program returns to step 104.

A video gateway performs a round of scheduling every 1/30 s. At this step, if the 1/30 s for this round of scheduling expires, the program quits this round of scheduling and returns to step 103 to enter the next round of scheduling. If not, it does not quit this round of scheduling and returns to step 104 to reselect the current data output interface.

In practice, before returning to step 104, the program waits for 5 ns to give this period of time for interfaces to get more tokens. When the FPGA technology is adopted, it uses hardware to implement the operation of returning to step 104, which takes a time interval of 5 ns. Therefore, it does not need to wait for 5 ns.

Here, the process ends.

FIG. 1 shows that, the current data output interface must be capable of accommodating the data to be sent on it, and must have the most idle bits among all interfaces. The more idle bits an interface has, the more data bits it needs to send, and the higher scheduling priority it has. The more times an interface is scheduled, the more bandwidth it occupies. In this way, the present invention allows for dynamic bandwidth adjustment based on the actual data output situations on interfaces, which cannot be achieved by using a fair scheduling method or a fixed-weight based scheduling method.

The flow in FIG. 1 adopts the number of tokens to represent the number of idle bits in the cache queue of a data output interface and modifies the token number according to received pulses in real time, to exactly reflect the data length an interface's cache queue can accommodate, (that is, the number of idle bits in the cache queue) and thus to improve the preciseness of scheduling.

The flow in FIG. 1 counts the number of data bits to be sent on an interface, and when the number reaches the preset threshold, updates the token bucket of the interface. This method uses the actual traffic information on a data output interface to update its token bucket. The traffic information reflects the cache queue information. In practice, other methods can be adopted to obtain the idle-bit length of a cache queue.

An example method is to get the ratio of the idle-bit length or the data length to the length of a cache queue in real-time or every a specified time interval, and use the ratio to calculate the idle-bit length. This method updates a token bucket according to cache queue changes.

Another example method is to count the data bits to be sent on each output interface, and when the preset counting time expires on an interface, inject the same number of tokens as the number of data bits to be sent into the corresponding token bucket. This method updates all token buckets at the same time, and the number of tokens a token bucket gets is based on the data bits to be sent on the corresponding interface. This method updates a token bucket using the traffic information on the corresponding interface.

In the flow of FIG. 1, if scheduling fails at step 105, and the scheduling time does not expire at step 107, the program returns to step 104 for reselecting the current data output interface. In practice, if the scheduling time does not expire at step 107, the program can select the data output interface with the second most tokens that was got at step 104 as the current output interface, and if it has enough tokens to accommodate data bits to be sent on it, perform scheduling for the interface and then return to step 103, or if not, select the data output interface with the third most tokens that was got at step 104 as the current output interface and repeat the above mentioned operation until this round of scheduling successes, or the scheduling time expires before it returns to step 103.

Switches and routers need to perform scheduling operations when data to be sent exits rather than at a specified scheduling interval. Therefore, if data to be sent exits at step 102 in FIG. 1, the program starts a round of scheduling and performs steps 103 and 105. At step 105, if the number of tokens of the current output interface is more than or equal to the number of data bits to be sent on it, the program performs step 106. This operation is the same as that in FIG. 1. The difference arises when the number of tokens of the current output interface is less than the number of data bits to be sent on it at step 105. In this case, the program on the router/switch can return to step 104, or the program can select the data output interface with the second most tokens that was got at step 104 as the current output interface, and if it has enough tokens to accommodate the data bits to be sent on it, perform scheduling for the interface and then return to step 103, or if not, select the data output interface with the third most tokens that was got at step 104 as the current output interface and repeat the above mentioned operation until this round of scheduling successes, or the scheduling time expires before returning to step 103.

However, dealing with all data output interfaces in sequence consumes too many resources. Moreover, when the program handles an interface with fewer tokens, the interface with the most tokens may have got enough tokens for sending data. Therefore, a maximum of scheduling failures for a round of scheduling should be set. When the maximum number, 2 for example, is reached, that is, scheduling for the interface with the second most tokens fails, the program returns to step 103 to start the next round of scheduling.

Steps 104 and 105 in FIG. 1 show a method of selecting the current data output interface (method 1). In practice, methods 2 and 3, which are described below, can also be adopted.

Method 2 comprises the following steps:

a1. Finding data output interfaces with tokens more than or equal to the data bits to be sent. The cache queue of such an interface must be capable of accommodating the data to be sent on it; if not, the interface cannot be scheduled. a2. Sorting these interfaces according to their tokens from more to less and selecting the one with the most tokens as the current data output interface.

After that, the program can put the data to be sent on the current data output interface to its cache queue and then return to step a1, or the program can select each of other interfaces sequenced at step a2 as the current data output interface in sequence, and after completing scheduling, return to step a1.

Method 3 comprises the following steps:

b1. Finds data output interfaces with tokens more than or equal to the data bits to be sent. If the cache queue of such an interface is not capable of accommodating the data to be sent on it, the interface cannot be scheduled. b2. Calculates the difference between the idle-bit length and the length of data bits to be sent for each data output interface. b3. Sequences these interfaces according to the differences from high to low and select the one with the highest difference as the current data output interface.

After that, the program can put the data to be sent on the current data output interface to its cache queue and then return to step b1, or the program can select each of other interfaces sequenced at step b3 as the current data output interface in sequence, and after completing scheduling, return to step a1.

Figure 2:
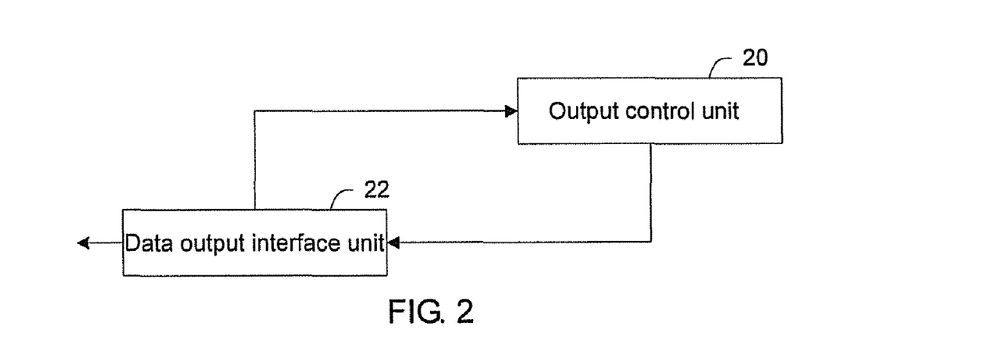
FIG. 2 is a schematic diagram illustrating the data output control apparatus of the present invention.

To implement the above mentioned data output control methods, the present invention provides an apparatus for data output control. FIG. 2 is a schematic diagram illustrating the apparatus, which comprises:

output control unit 20, which monitors data output interface unit 22, gets the idle-bit length information of data output interface unit 22 according to relevant information sent from it, and if its idle-bit length is equal to or longer than the length of data to be sent on it, puts the data to the cache queue of data output interface unit 22;

data output interface unit 22, which sends out the data in its cache.

Figure 3:
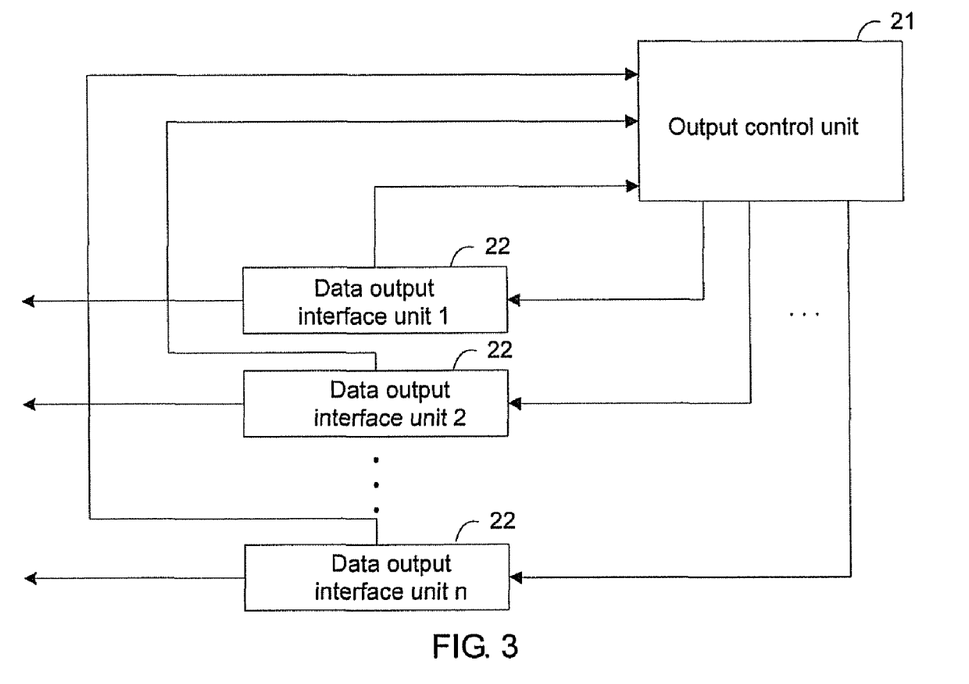
FIG. 3 is a schematic diagram illustrating the data output control apparatus with more than one data output interface unit 22.

FIG. 3 illustrates the schematic diagram of a data output control apparatus with more than one data output interface unit. It comprises output control unit 21 and n data output interface unit 22.

The following gives details about the implementation of the output control unit and data output interface units.

Figure 4:
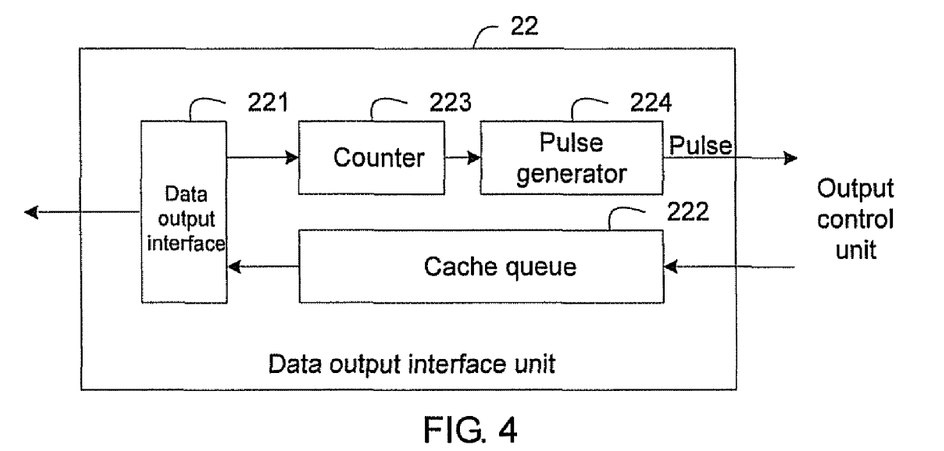
FIG. 4 is a schematic diagram illustrating data output interface unit 22 in FIG. 3.

FIG. 4 gives the schematic diagram of data output interface 22, which is also applicable to data output interface 22 in FIG. 2. As shown in FIG. 3, data output interface 22 comprises:

data output interface 221, which gets data from cache queue 222 and sends the data out;

cache queue 222, which caches the data from the output control unit;

counter 223, which counts the number of data bits to be sent by data output interface 221, when the number reaches the threshold, informs the event to pulse generator 224, and counts from zero;

pulse generator 224, which, upon receiving the event from counter 223, generates pulses to the output control unit.

A method for regular to-be-sent-traffic information feedback, which was mentioned above, comprises:

data output interface unit 22 that does not comprise pulse generator 224;

a timer that starts when counter 223 starts, and upon expiration, tells counter 223 to send the counted number to the output control unit.

In the two methods, the feedback information sent by data output interface unit 22 is traffic information.

Figure 5:
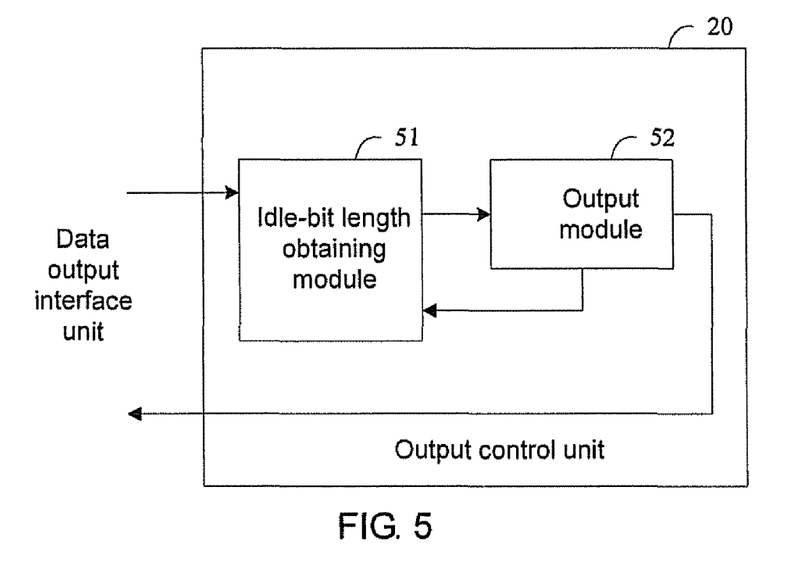
FIG. 5 is a schematic diagram illustrating output control unit 20 in FIG. 2.

FIG. 5 illustrates the schematic diagram of output control unit 20 in FIG. 2, which comprises:

idle-bit length obtaining module 51, which has a token bucket to use tokens to represent the data bits in the cache queue of data output interface unit 22;

after receiving pulses from data output interface 22, translates pulses to a token number, and puts the same number of tokens into the token bucket;

when output module 52 puts the data to be sent on data output interface unit 22 into the cache queue of data output interface unit 22, reduces the same number of tokens as the number of scheduled data bits.

output module 52, which, when finding the tokens are more than or equal to the data bits to be sent, puts the data into the corresponding cache queue.

Figure 6:
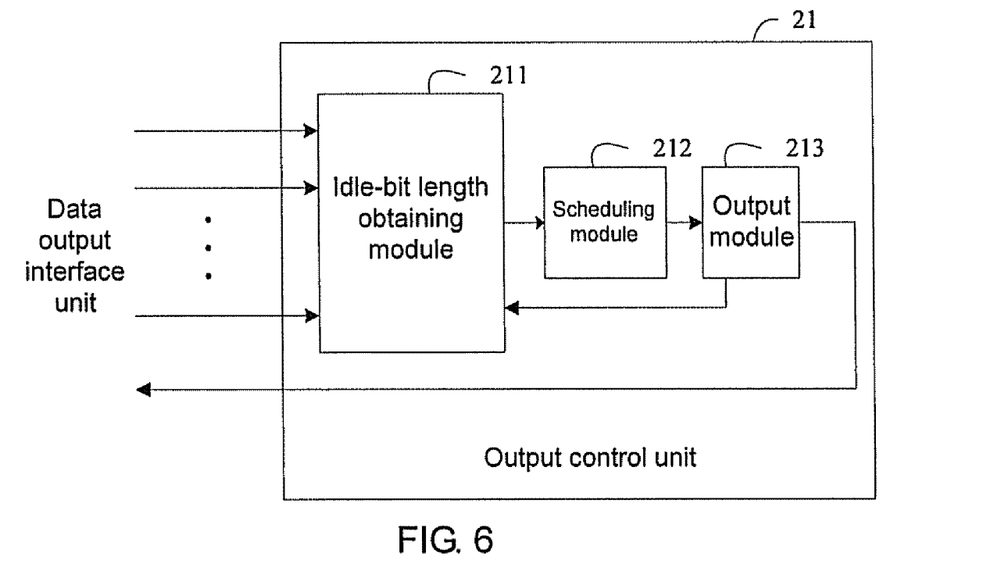
FIG. 6 is a schematic diagram illustrating output control unit 21 in FIG. 3.

FIG. 6 shows the schematic diagram of output control unit 21, which comprises idle-bit length obtaining module 211, scheduling module 212 and output module 213.

Idle-bit length obtaining module 211 obtains the length of idle bits in the cache queue of data output interface unit 22 according to the traffic information (which, as above mentioned, can be pulses sent from data output interface unit 22) received from data output interface unit 22, and sends the idle-bit length information to scheduling module 212.

Specifically, idle-bit length obtaining module 211 comprises a token bucket for each data output interface unit and a token bucket maintenance sub-module (which are not shown in FIG. 5), which, initializes each token bucket;

upon receiving pulse signals from a data output interface unit, puts the same number of tokens as the threshold of the data output interface unit into the token bucket of the data output interface unit;

takes the token number of each data output interface unit as the idle-bit length, and sends such idle-bit length information to scheduling module 212;

when output module 213 puts data into the cache queue of a data output interface unit, reduces the same number of tokens as the number of cached data bits from the token bucket.

Scheduling module 212 receives idle-bit length information from idle-bit length obtaining module 211, that is, the token number of each data output interface, and selects the current data output interface based on such information. The current data output interface must have an idle-bit length equal to or longer than the length of data to be sent on it.

Figure 7:
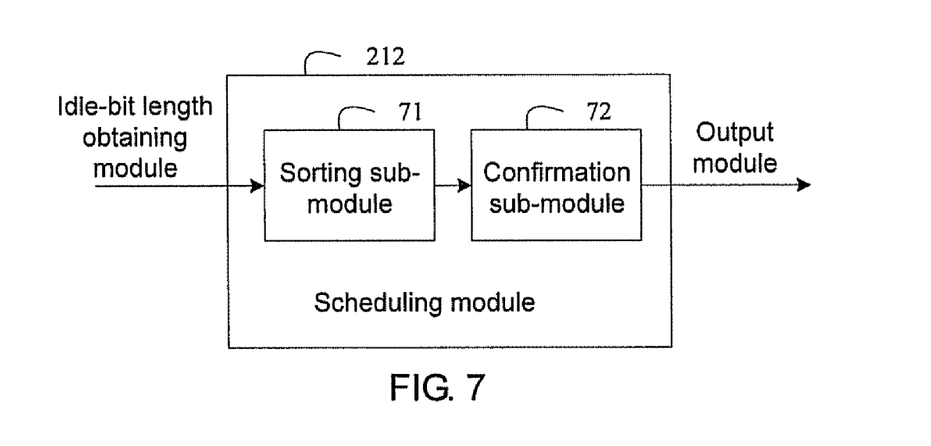
FIG. 7 is a schematic diagram illustrating scheduling module 212 in FIG. 6.

Scheduling module 212 can adopt another scheduling method. FIG. 7 is the schematic diagram of scheduling module 212 in FIG. 6, which comprises:

sorting sub-module 71, which sequences data output interface units according to their tokens from more to less and finds the one with the most tokens;

confirmation sub-module 72, which takes the data output interface unit with the most tokens as the current data output interface unit when the tokens are no less than the data bits to be sent on it.

The above-mentioned scheduling methods 2 and 3 can use the structure of scheduling module 212 shown in FIG. 7, but sorting sub-module 71 and confirmation sub-module 72 for one method have different functions from those for the other method.

Sorting sub-module 71 and confirmation sub-module 72 for scheduling method 2 have following functions:

Sorting sub-module 71 identifies data output interface units with tokens no less than data bits to be sent and sequences these data output interface units according to their tokens from more to less;

Confirmation sub-module 72 takes the data output interface unit with the most tokens as the current data output interface unit.

Sorting sub-module 71 and confirmation sub-module 72 for scheduling method 3 have following functions:

Sorting sub-module 71 identifies data output interface units with tokens no less than data bits to be sent, calculates the difference between tokens and data bits for each data output interface unit and sequences these data output interface units according to their differences from high to low;

Confirmation sub-module 72 takes the data output interface unit with the highest difference as the current data output interface unit.

The above shows the components and functions of scheduling module 212.

Output module 213 of output control unit 21 puts the data to be sent on the current data output interface unit selected by scheduling module 212 to the cache queue of the current data output interface unit.

Figure 8:
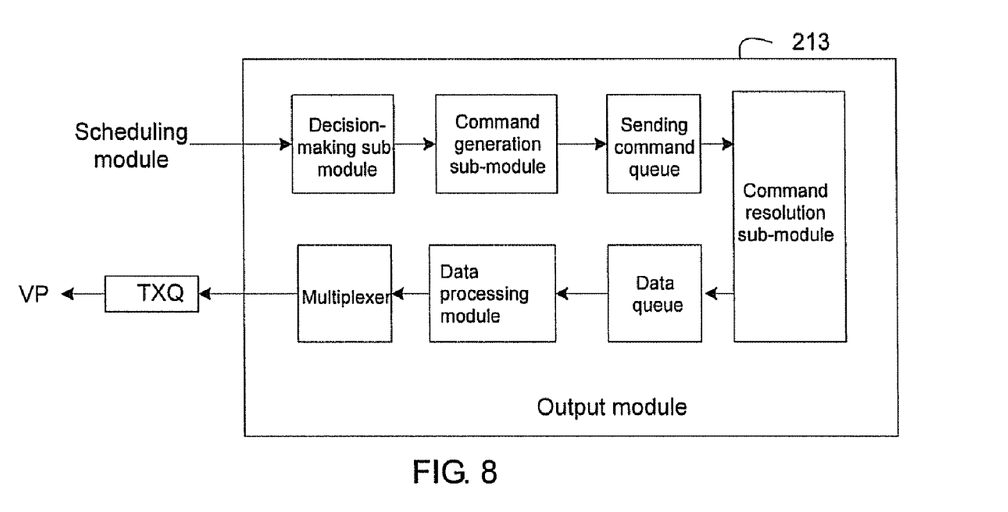
FIG. 8 is a schematic diagram illustrating output module 213 in FIG. 6.

For the data output control apparatus to be used on a video gateway, data output interface 221 of data output interface unit 22 is a VP, and cache queue 222 of data output interface unit 22 is a TXQ. FIG. 8 shows the schematic diagram of output module 213 of the data output control apparatus used on a video gateway. Output module 213 comprises a decision-making sub-module, a command generation sub-module, a sending command queue for caching sending commands, a command resolution sub-module, a data queue for caching video data to be processed such as image processing, a data processing sub-module and a multiplexer, wherein:

The decision-making sub-module checks whether the current data output interface unit selected by scheduling module 212 has enough idle bits to accommodate data bits to be sent, and if yes, informs the result to the command generation sub-module;

The command generation sub-module generates sending commands for data to be sent, and caches sending commands into the sending command queue. A sending command contains the storage address and length of the data to be sent;

The command resolution sub-module handles the sending commands in the sending command queue in sequence to get the data to be sent, and puts the data to the data queue;

The data processing sub-module processes the data in the data queue in sequence, such as image processing, and sends the processed data to the TXQ of the corresponding VP through the multiplexer.

Although several embodiments of the invention and their advantages are described in detail, a person skilled in the art could make various alternations, additions, and omissions without departing from the spirit and scope of the present invention as defined by the appended claims.

What is claimed is:

1. A method for data output control, comprising:

setting a token bucket for each data output interface of a plurality of data output interfaces, wherein each data output interface of the plurality has a cache queue and a respective counter, and wherein idle bits in each of the cache queues of the data output interfaces are represented by tokens in the corresponding token bucket;

at each data output interface, providing the respective counter of the data output interface with information indicative of data bits at the data output interface that are to be sent by the data output interface;

at the respective counter of each data output interface, counting a respective number of data bits at the data output interface that are to be sent by the data output interface, and when the respective number reaches a respective threshold number for the data output interface, placing a number of tokens equal to the respective threshold number into the token bucket of the data output interface;

obtaining a length of idle bits in the cache queue of each of the plurality of data output interfaces;

selecting from the plurality of data output interfaces a first data output interface, wherein a length of idle bits in the cache queue of the first data output interface is equal to or greater than a length of data bits in data to be sent from an output control unit connected the cache queue of the first data output interface; and placing the data to be sent from the output control unit into the cache queue of the first data output interface.

2. The method of claim 1, further comprising:

after placing the data to be sent from the output control unit into the cache queue of the first data output interface, removing from the token bucket of the first output interface a number of tokens equal to the length of data bits in the data placed in the cache queue of the first data output interface.

3. The method of claim 1, wherein selecting from the plurality of data output interfaces the first data output interface comprises:

sorting data output interfaces by idle-bit length and identifying a data output interface with a longest idle-bit length; and selecting a data output interface with the longest idle-bit length as the first data output interface if the idle-bit length of the first data output interface is equal to or greater than the length of data bits in the data to be sent from the output control unit.

4. The method of claim 3, further comprising: if the idle-bit length of the first data output interface is shorter than the length of data bits of data to be sent from the output control unit, re-sorting the data output interfaces and selecting a second data output interface having a second longest idle-bit length.

5. The method of claim 1, wherein selecting from the plurality of data output interfaces the first data output interface comprises:

identifying data output interfaces with an idle-bit length equal to or greater than a length of data bits of data to be sent from the output control unit; and sorting the identified data output interfaces by idle-bit length and identifying a data output interface with the longest idle-bit length.

6. The method of claim 5, further comprising:
after placing the data to be sent from the output control unit into the first data output interface into the cache queue of the first data output interface, carrying out one function selected from repeating the operation of identifying data output interfaces with an idle-bit length equal to or greater than a length of data bits to be sent from the output control unit, and
taking in sequence each of the identified data output interfaces except the one data output interface with the longest idle-bit length and placing data to be sent from the output control unit into the cache queue of the corresponding data output interface.

7. The method of claim 1, wherein selecting from the plurality of data output interfaces the first data output interface comprises:
identifying data output interfaces with an idle-bit length equal to or greater than the length of data bits of data to be sent from the output control unit;
calculating differences between idle-bit lengths and the length of data bits of data to be sent from the output control unit for each data output interface; and
sorting the data output interfaces by length difference and selecting a data output interface with a highest difference as the first data output interface.

8. The method of claim 7, further comprising:
after placing the data to be sent from the output control unit into the first data output interface into the cache queue of the first data output interface, carrying out one function selected from repeating the operation of identifying data output interfaces with an idle-bit length equal to or greater than the length of data bits of data to be sent from the output control unit; or
taking in sequence each of the identified data output interfaces except the data output interface with the highest difference, and placing the data to be sent from the output control unit into the corresponding cache queue.

9. An apparatus for data output control of a data output interface, comprising:
a plurality of data output interface units, each data output interface unit of the plurality having a respective data output interface and a respective cache queue, and each data output interface unit configured to output data in its respective cache queue via its respective data output interface; and
an output control unit configured to receive an idle-bit length of each of the plurality of data output interface units, use the idle-bit length to select a first data output interface unit for which the idle-bit length is equal to or greater than a bit length of data to be sent from the output control unit, and place the data to be sent from the output control unit into the respective cache queue of the first data output interface unit,
wherein each data output interface unit of the plurality is further configured to count a respective number of data bits at its respective data output interface that are to be output by its respective data output interface, and to provide the count as its idle-bit length to the output control unit.

10. The apparatus of claim 9, wherein the output control unit comprises:
an idle-bit length obtaining module and a scheduling module, wherein the idle-bit length obtaining module is configured to obtain the idle-bit length of each data output interface unit according to traffic information received from the data output interface units, and send the idle-bit length of each data output interface unit to the scheduling module,
and wherein the scheduling module is configured to use the idle-bit length of each data output interface units to select the first data output interface unit; and
an output module configured to place the data to be sent from the output control unit into the respective cache queue of the first data output interface.

11. The apparatus of claim 10, wherein each data output interface unit of the plurality sends traffic information to the output control unit.

12. The apparatus of claim 10, wherein the scheduling module comprises:
a sorting sub-module configured to sort data output interface units by idle-bit length, and to identify a data output interface unit with the longest idle-bit length; and
a confirmation sub-module configured to take the data output interface unit with the longest idle-bit length as the first data output interface unit if the idle-bit length of the first data output interface unit is equal to or greater than the length of data to be sent from the output control unit.

13. The apparatus of claim 10, wherein the scheduling module comprises:
a sorting sub-module configured to identify data output interface units having an idle-bit length equal to or greater than the length of the data to be sent from the output control unit and to sort the identified data output interface units by idle-bit length; and
a confirmation sub-module configured to select a data output interface unit with the longest idle-bit length from among those identified data output interface units as the first data output interface unit.

14. The apparatus of claim 10, wherein the scheduling module comprises:
a sorting sub-module configured to identify data output interface units having an idle-bit length equal to or greater than the length of the data to be sent from the output control unit, calculate differences between the idle-bit lengths and the length of data bits of data to be sent from the output control unit for each of the identified data output interface units, and sort the data output interface units by calculated difference; and
a confirmation sub-module configured to select the data output interface unit with the highest difference from among those identified data output interface units as the first data output interface unit.

15. The apparatus of claim 10, wherein each data output interface unit comprises:
a counter and a pulse generator, wherein the counter is configured to count a number of data bits its respective data output interface that are to be output by its respective data output interface, and upon occurrence of an event in which the number reaches a preset threshold, inform the pulse generator of the event,
wherein the pulse generator is configured to generate a pulse signal to the output control unit upon being informed of the event,
and wherein the idle-bit length obtaining module comprises a token bucket for each data output interface unit and a token bucket maintenance sub-module configured to:
upon receiving a pulse signal, place a same number of tokens as the threshold into the token bucket of the data output interface unit that sent the pulse signal, and when the output control module places the data to be sent from the output control unit into the respective cache queue of the first data output interface unit, remove a same number of tokens as the bit length of data placed into the respective cache queue from the token bucket for the first data output interface unit.

* * * * *

UNITED STATES PATENT AND TRADEMARK OFFICE
CERTIFICATE OF CORRECTION

PATENT NO. : 8,375,153 B2  Page 1 of 1
APPLICATION NO. : 12/429395
DATED : February 12, 2013
INVENTOR(S) : Zhaohu Jin et al.

It is certified that error appears in the above-identified patent and that said Letters Patent is hereby corrected as shown below:

On the title page, in Item (75), Inventors, in column 1, line 1, delete "Jin Zhaohu" and insert -- Zhaohu Jin, --, therefor.

In the Specifications:

In column 3, line 20, delete "a" and insert -- an --, therefor.

In column 3, lines 25-29, delete "an output control unit, which gets idle-bit length of the cache queue of the data output interface unit, and if the idle-bit length is equal to or longer than the length of data bits to be sent, puts the data to be sent into the cache queue of the data output interface unit;" and
insert -- a data output interface unit, which sends out the data in its cache queue. --, therefor.

Signed and Sealed this
Fourteenth Day of May, 2013

Teresa Stanek Rea
*Acting Director of the United States Patent and Trademark Office*